(12) United States Patent
Puck

(10) Patent No.: US 12,495,895 B2
(45) Date of Patent: Dec. 16, 2025

(54) CONNECTOR ASSEMBLY, COLUMN, PIECE OF FURNITURE AND METHOD OF MANUFACTURING A COLUMN

(71) Applicant: LOGICDATA Electronic & Software Entwicklungs GmbH, Deutschlandsberg (AT)

(72) Inventor: Hannes Puck, Stainz (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 322 days.

(21) Appl. No.: 18/339,525

(22) Filed: Jun. 22, 2023

(65) Prior Publication Data

US 2024/0008637 A1    Jan. 11, 2024

(30) Foreign Application Priority Data

Jul. 6, 2022    (DE) ...................... 10 2022 116 843.3

(51) Int. Cl.
*A47B 9/20*    (2006.01)
*A47C 19/04*    (2006.01)

(52) U.S. Cl.
CPC .............. *A47B 9/20* (2013.01); *A47C 19/045* (2013.01)

(58) Field of Classification Search
CPC ..... A47B 9/20; A47B 9/04; A47B 2200/0051; A47C 19/045
See application file for complete search history.

(56) References Cited

U.S. PATENT DOCUMENTS

| | | | |
|---|---|---|---|
| 2009/0121100 A1* | 5/2009 | Waidelich | A47B 9/04 248/188.4 |
| 2011/0061570 A1* | 3/2011 | Klinke | F16H 25/2021 310/68 B |
| 2014/0020488 A1* | 1/2014 | Koch | F16H 25/12 29/525.01 |
| 2016/0047446 A1 | 2/2016 | Hung | |
| 2018/0172062 A1* | 6/2018 | Hu | F16H 25/2056 |
| 2020/0085184 A1* | 3/2020 | Lu | A47B 9/04 |

(Continued)

FOREIGN PATENT DOCUMENTS

| | | |
|---|---|---|
| CN | 106907440 A | 6/2017 |
| DE | 102012013979 A1 | 1/2014 |

(Continued)

*Primary Examiner* — Daniel J Rohrhoff
(74) *Attorney, Agent, or Firm* — Eschweiler & Potashnik, LLC

(57) ABSTRACT

A connector assembly for connecting a linear actuator to a telescopic housing includes an adapter part and a connector part. The linear actuator includes a telescopic tube system having an outer tube surrounding an inner spindle system. The telescopic housing has first, second, and third telescopic members arranged coaxially, with the third telescopic member arranged at least partially inside the first telescopic member and at least partially outside the second telescopic member. The adapter part is provided for attachment to the third telescopic part. The connector part is provided for attachment to the outer tube. The adapter part and the connector part have mechanical formations for producing a positive connection in the axial direction, which is arranged for connecting the outer tube to the third telescopic part.

19 Claims, 14 Drawing Sheets

(56) References Cited

U.S. PATENT DOCUMENTS

| | | | | |
|---|---|---|---|---|
| 2021/0321760 A1* | 10/2021 | Windhaber | ............. | A47B 9/04 |
| 2022/0243793 A1* | 8/2022 | Hu | ............. | A47B 9/04 |
| 2024/0008637 A1* | 1/2024 | Puck | ............. | A47B 9/20 |
| 2024/0057762 A1* | 2/2024 | Höglund | ............. | A47B 9/04 |
| 2024/0060553 A1* | 2/2024 | Niederkofler | ............. | F16H 25/24 |
| 2024/0292944 A1* | 9/2024 | Meyer | ............. | A47B 9/04 |

FOREIGN PATENT DOCUMENTS

| | | |
|---|---|---|
| EP | 2684488 A1 | 1/2014 |
| WO | 2017143708 A1 | 8/2017 |
| WO | 2018199827 A1 | 11/2018 |

* cited by examiner

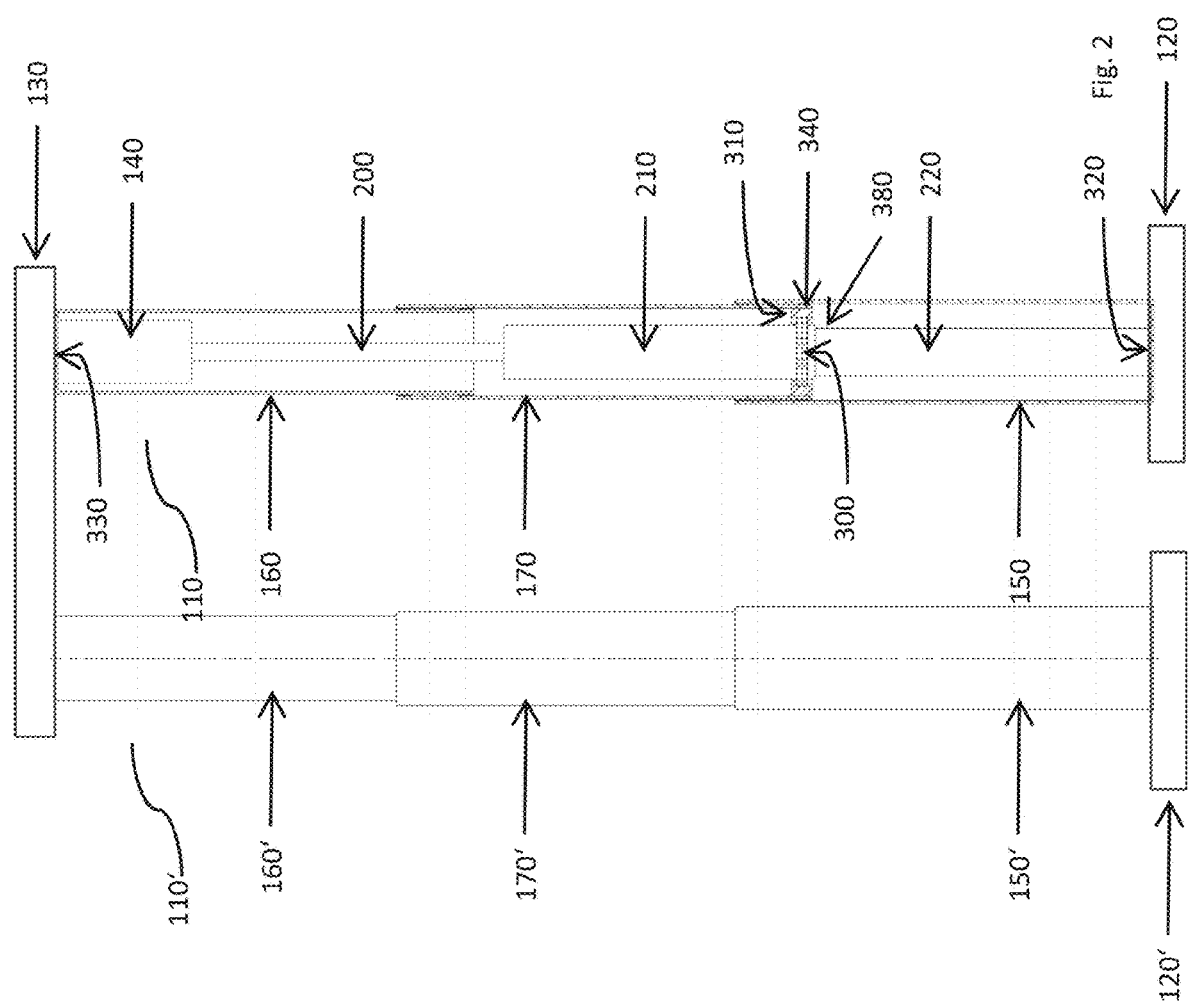

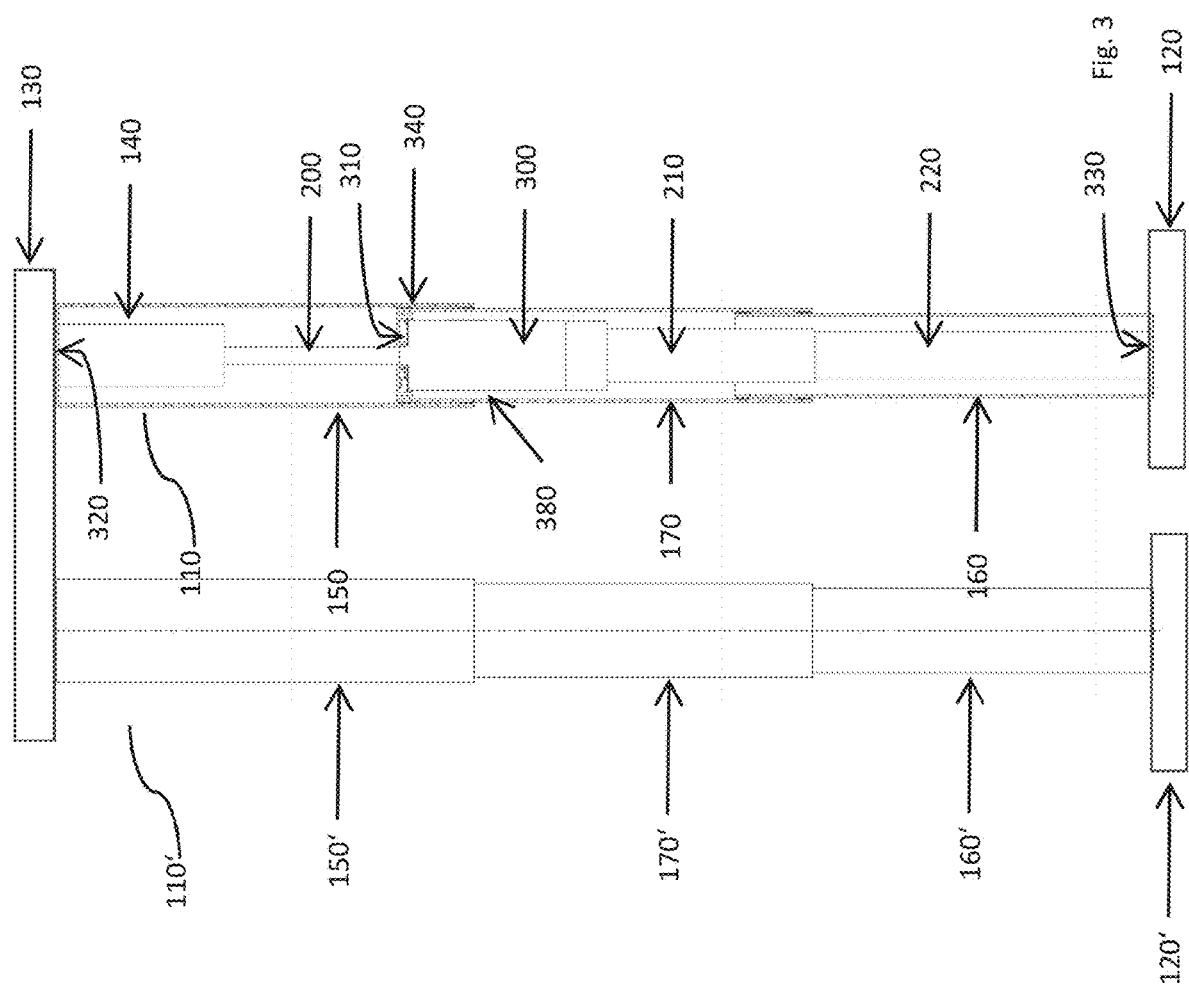

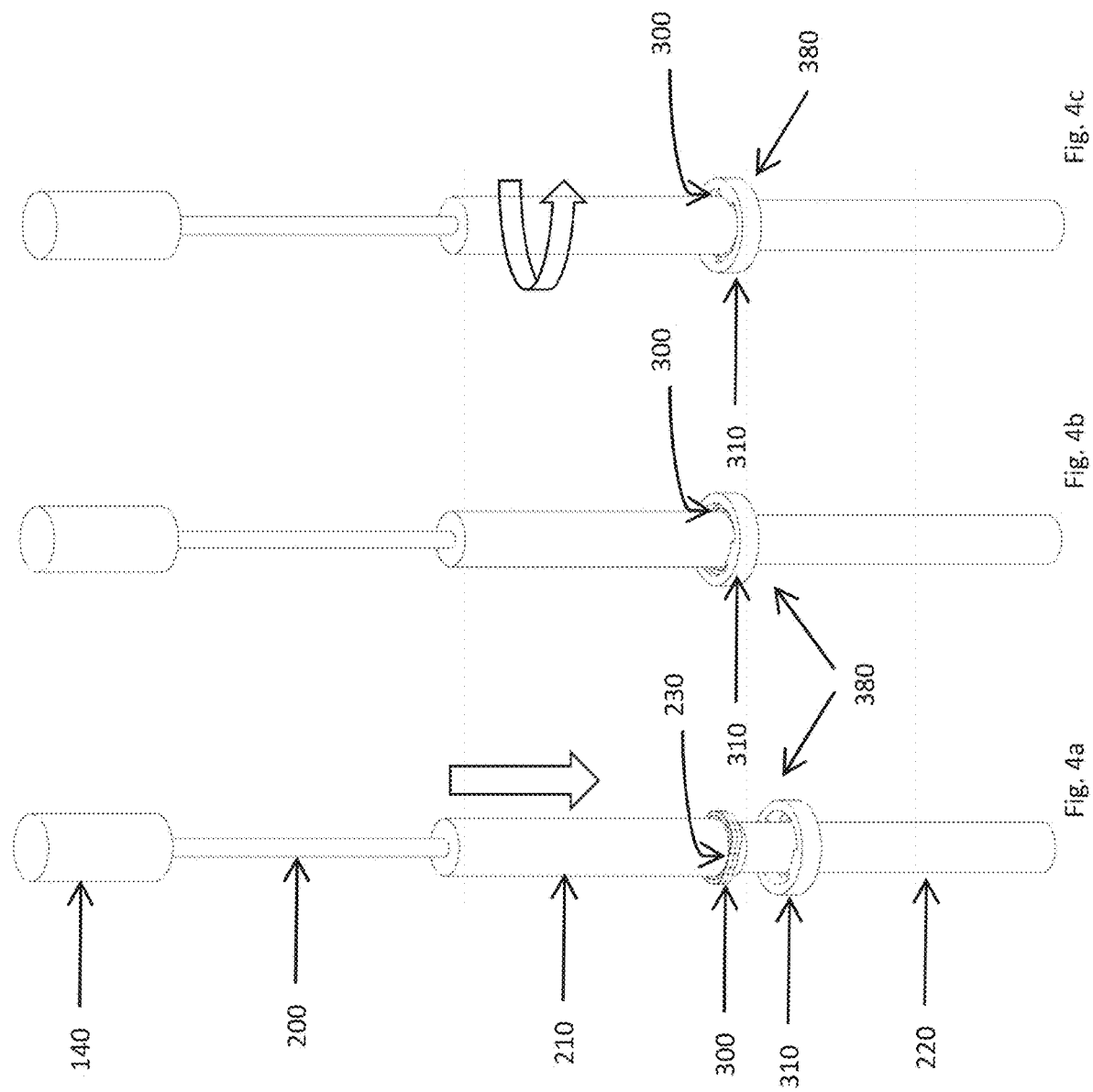

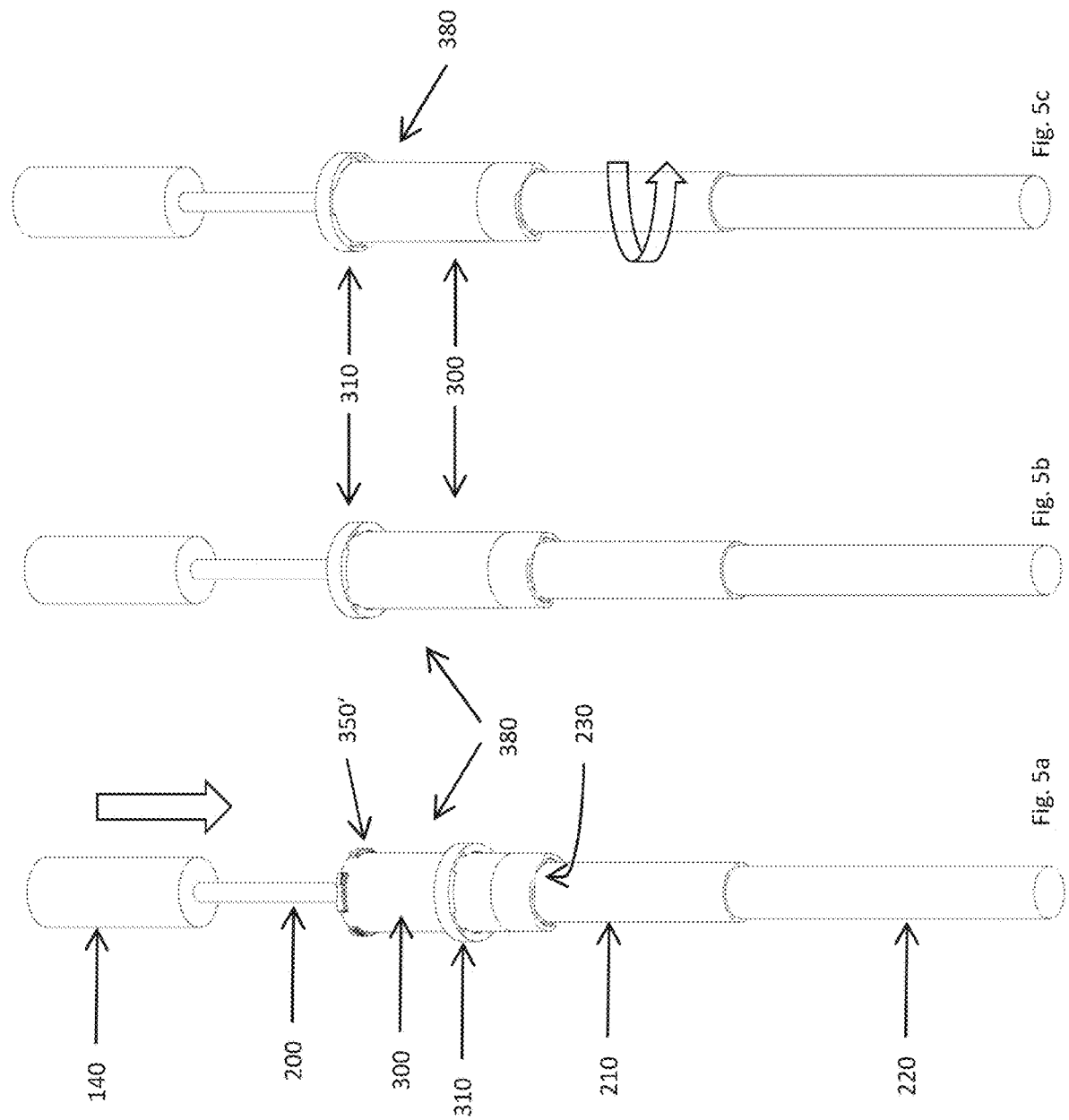

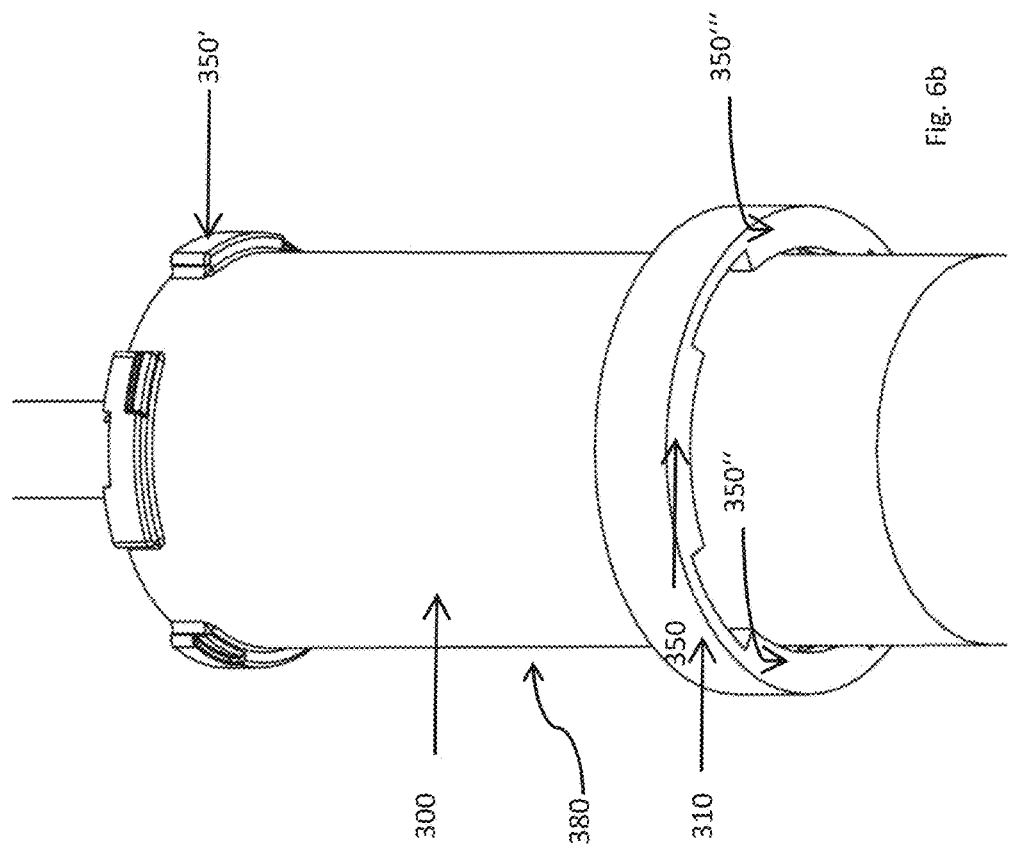
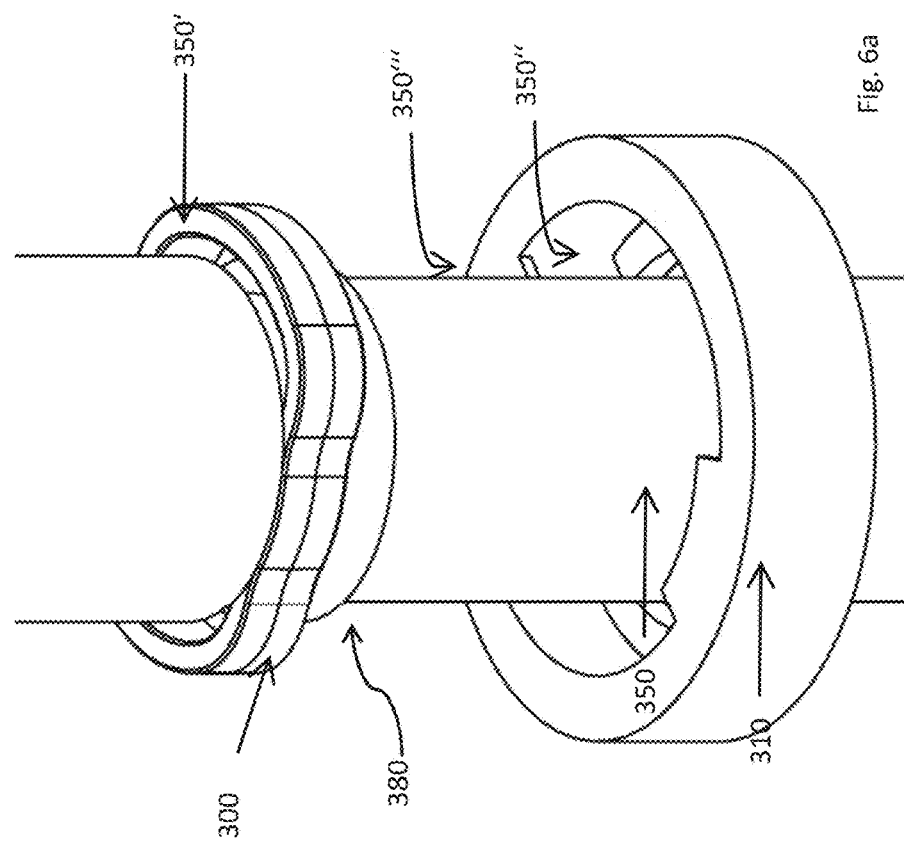

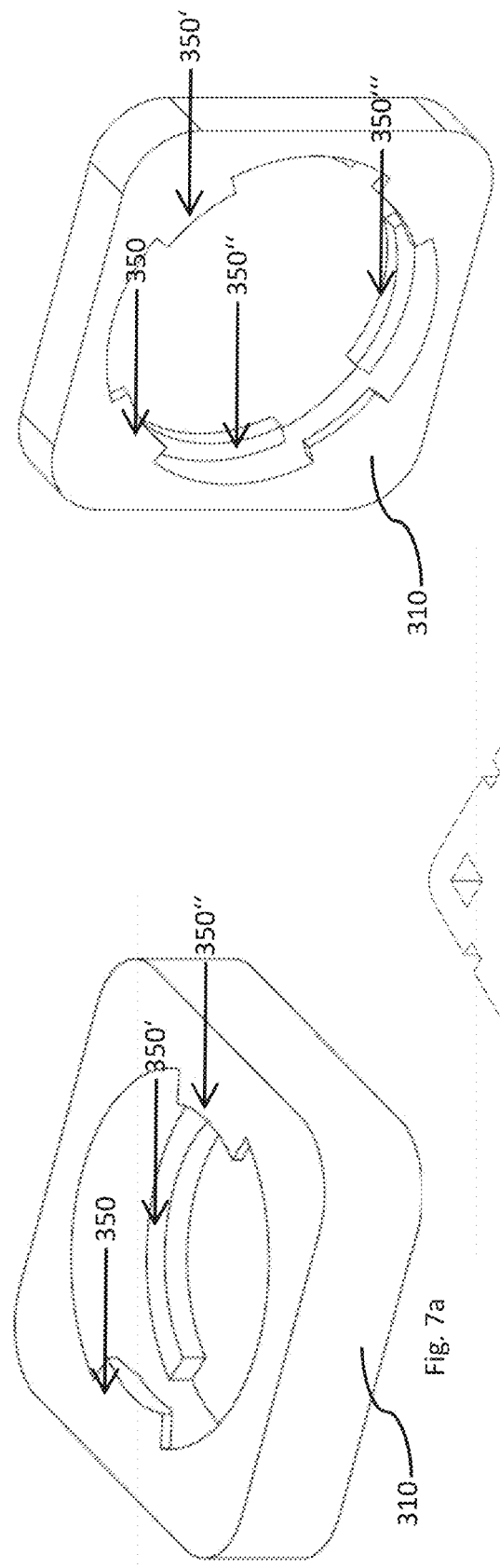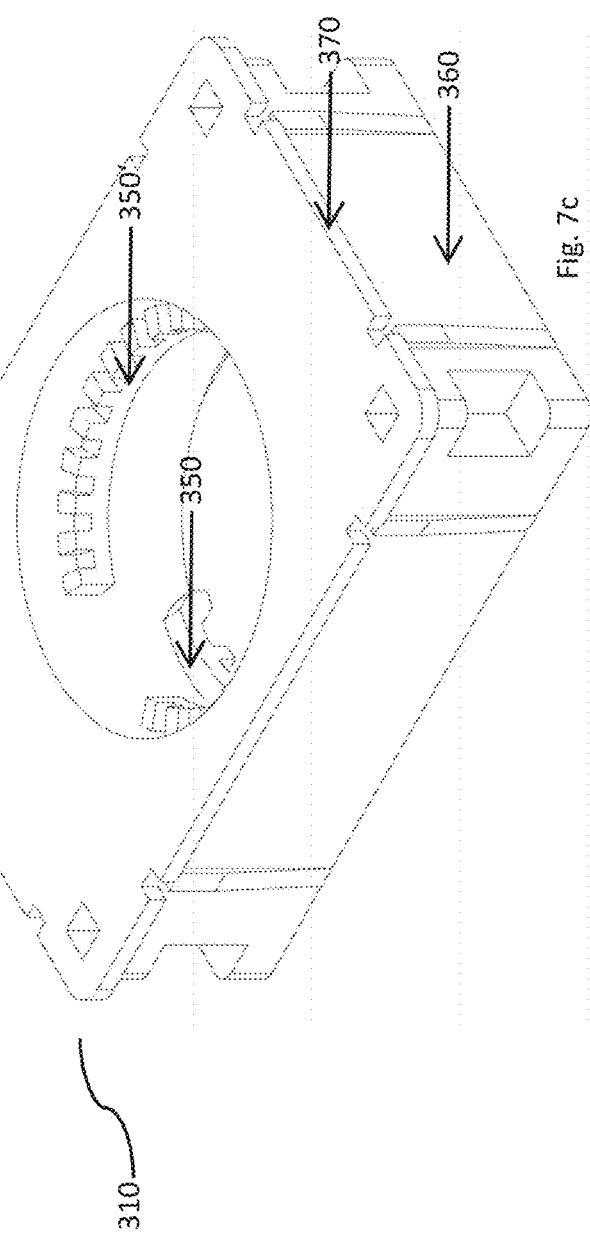

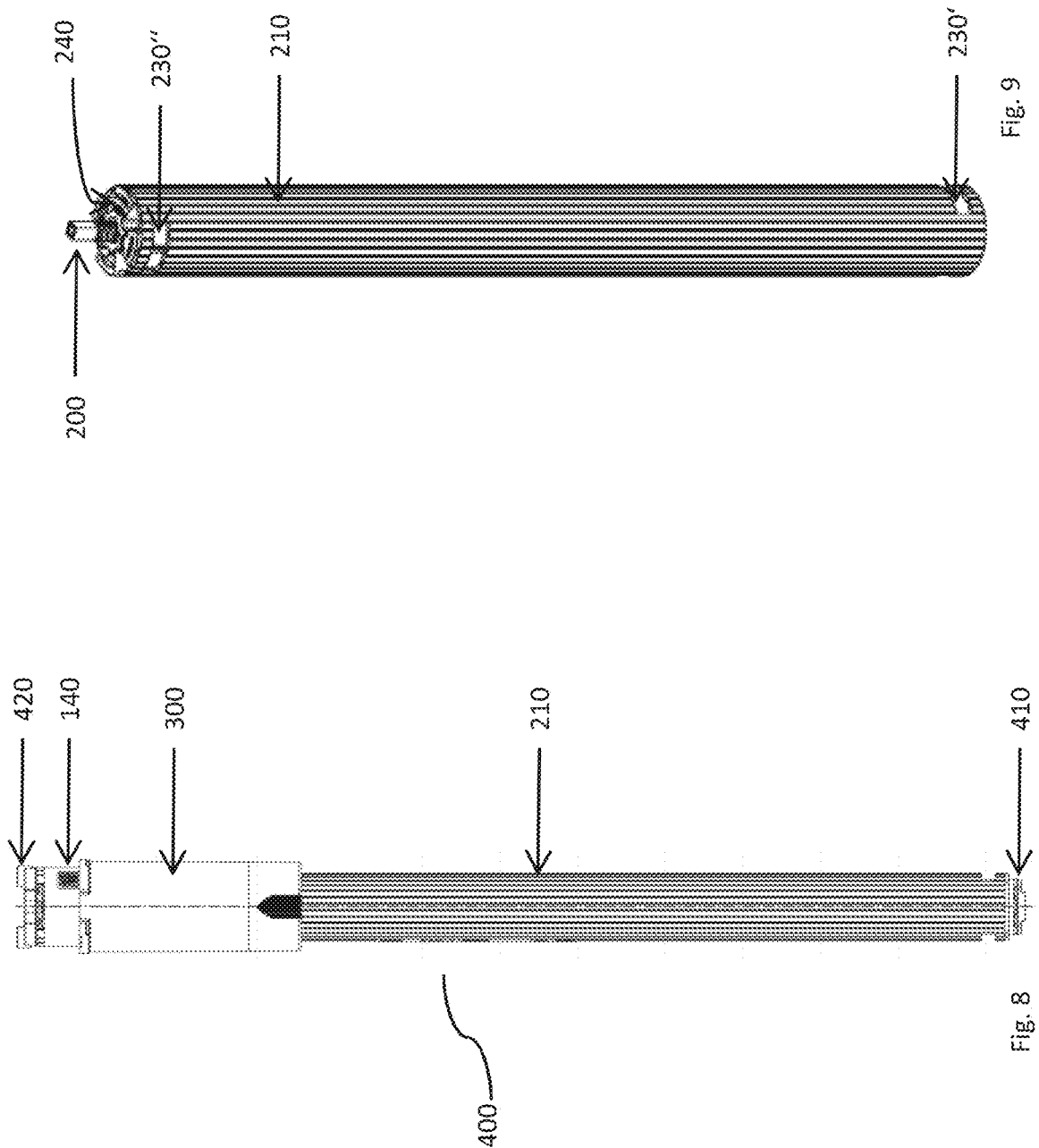

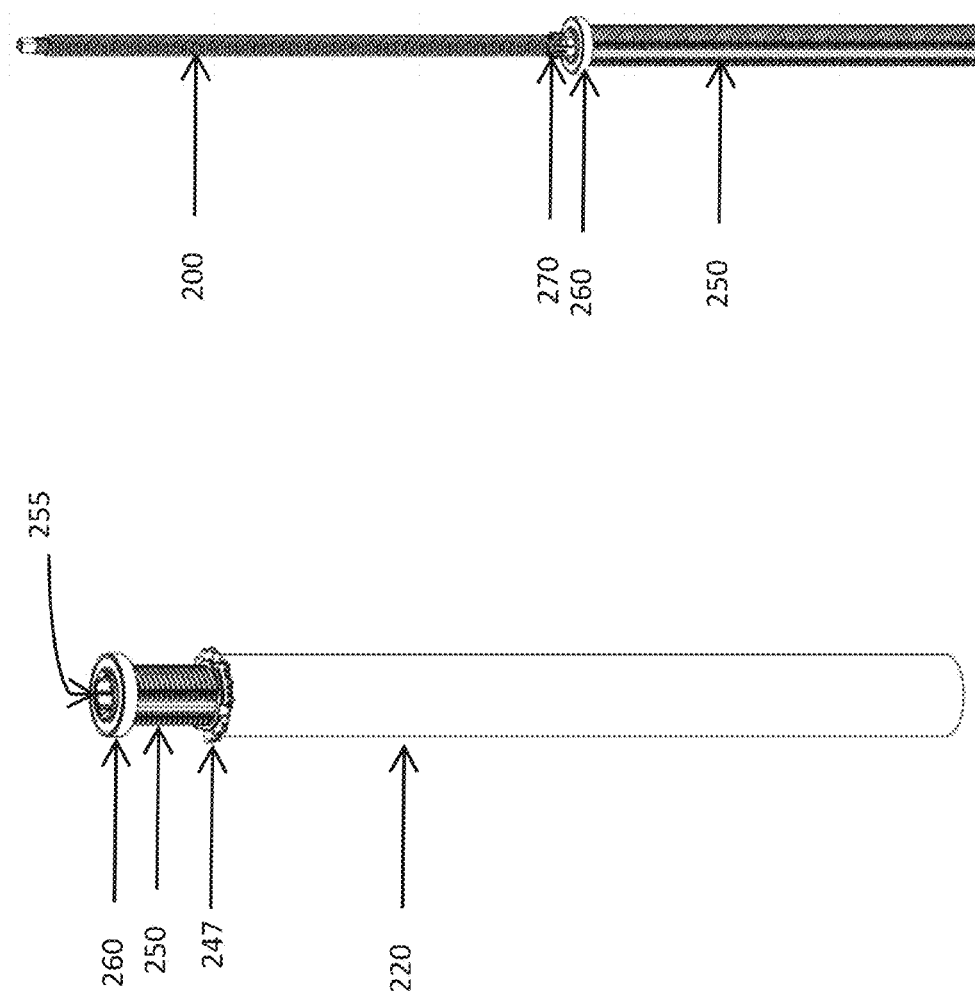

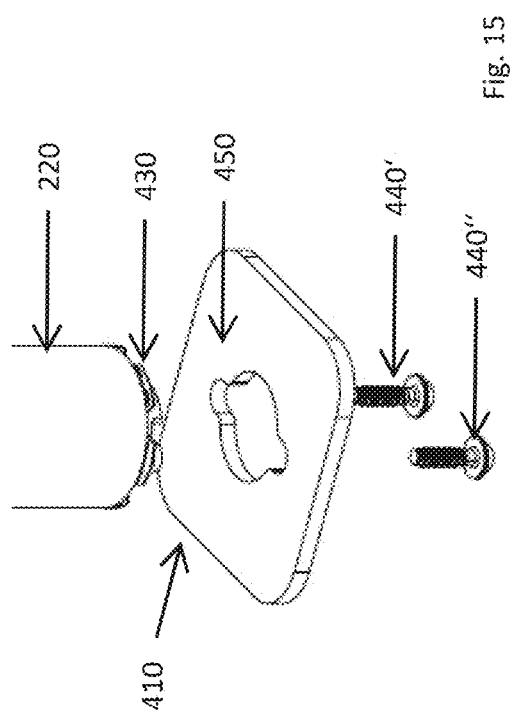

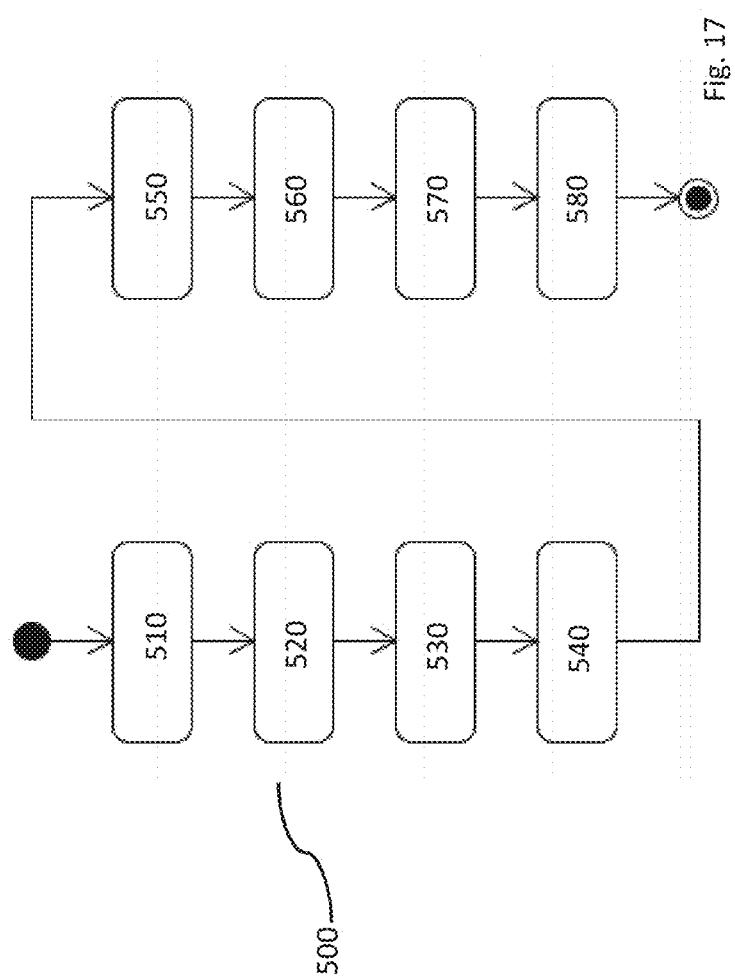

CONNECTOR ASSEMBLY, COLUMN, PIECE OF FURNITURE AND METHOD OF MANUFACTURING A COLUMN

REFERENCE TO RELATED APPLICATIONS

This application claims priority to German Application number 10 2022 116 843.3, filed on Jul. 6, 2022. The contents of the above-referenced Patent Applications are hereby incorporated by reference in their entirety.

FIELD

The present disclosure relates to a connector assembly between a telescopic housing and a linear actuator, which is used, for example, in the field of electrically adjustable tables. Furthermore, the present disclosure relates to a length-adjustable column for electrically adjustable tables with such a connector assembly and a method for manufacturing such a column.

BACKGROUND

Electrically adjustable tables include, for example, one or more height-adjustable table columns having a telescopic housing and a linear actuator located in the telescopic housing. Table columns typically connect a table base to the table top directly, or to a support system on which the table top is mounted.

In particular, a table column may include a three-stage telescopic housing having three telescopic members coaxially disposed within one another.

For example, a first telescopic member of the telescopic housing is connected to the table base, a second telescopic member is directly connected to the support system of the table top or the table top, and a third telescopic member is arranged inside the first telescopic member and outside the second telescopic member (thick-end-down).

In an alternative embodiment, for example, a first telescopic member is directly connected to the support system of the tabletop or table top, a second telescopic member is connected to the table base, and a third telescopic member is arranged inside the first telescopic member and outside the second telescopic member (thick-end-up).

In both embodiments, when the height is adjusted, each of the inner telescopic members is axially extended from the next larger one that immediately surrounds it by the change in length of the internal linear actuator. During the height adjustment, the telescopic member adjacent to the table top moves away from the telescopic member adjacent to the table base at a velocity v.

SUMMARY

In order to achieve a movement of the telescopic parts relative to each other that is perceived as harmonious by the user, the third telescopic member moves at half the speed, i.e. v/2. In this context, this movement is also referred to as synchronized movement of the third telescopic member.

With this background, one objective is to specify an improved connection concept that enables rapid assembly and disassembly of a linear actuator in a telescopic housing and synchronized movement of the third telescopic member.

This objective is achieved with the subject matter of the independent claims. Further embodiments are characterized in the dependent claims.

A linear actuator within the meaning of the present disclosure comprises at least one drive, preferably electric, and a telescopic tube system surrounding an internal spindle system, wherein the telescopic tube system comprises an outer tube and at least one inner tube arranged coaxially to the outer tube and at least partially surrounded by the outer tube. Optionally, the linear actuator may also comprise a gearbox, in particular a planetary gearbox and/or a brake.

In such a linear actuator, a rotational movement of the spindle system, for example, does not cause a rotational movement of the outer tube. The rotational movement of the spindle system causes, for example, a translational movement of the outer tube in the axial direction. Similarly, translational movement of the third telescopic member connected to the outer tube may be caused in the axial direction.

For example, such a telescopic tube system with an internal spindle system may have the following structure:

A drive spindle is connected to the drive. The drive spindle is located inside a hollow spindle.

On the drive spindle is a drive spindle nut. The drive spindle nut has a holder for an outer tube. In addition, a hollow spindle is attached to the drive spindle nut via a ball bearing.

The hollow spindle is ribbed on the inside. A sliding element, which is non-rotatably connected to the drive spindle, transmits the torque to the hollow spindle via the ribs of the hollow spindle.

The hollow spindle has a hollow spindle nut. The hollow spindle nut has a retainer for the inner tube and the outer tube. The retainer is non-rotatably connected to the inner tube and non-rotatably connected to the outer tube.

The hollow spindle has a sliding guide for the inner tube at one end. For this purpose, the inner tube is smooth on the inside, for example, and allows rotational movement of the inner tube relative to the hollow spindle.

The improved connection concept is based on the idea of providing a two-part connector assembly with an adapter part and a connector part, which are attached to the inside of the telescopic housing on the one hand and to the outer tube of the linear actuator on the other before final assembly. For final assembly, a positive connection can be made between the adapter part and the connector part, which is used to connect the outer tube to the third telescopic part. For this purpose, the adapter part and the connector part have mechanical formations for producing the positive connection in the axial direction. For example, the positive connection can be established and separated simply by inserting the adapter part and the connector part into one another and rotating them in opposite directions. After assembly, loosening of the positive connection can be prevented by rotationally fixing the ends of the linear actuator with respect to the first and/or second telescopic part, i.e. the outer telescopic parts. In addition, axial movement between the ends of the linear actuator and the outer telescopic parts can be prevented. The assembly effort is thus reduced.

Accordingly, a connector assembly according to the improved connection concept for connecting a linear actuator to a telescopic housing comprises an adapter part and a connector part. The adapter part is provided for attachment to the third telescopic part of the telescopic housing. The connector part is provided for attachment to the outer tube of the linear actuator. The adapter part and the connector part have mechanical formations for establishing a positive connection in the axial direction, which is arranged for connecting the outer tube to the third telescopic part.

In the assembled state, the linear actuator is located in the telescopic housing. Both ends of the linear actuator can be connected to the telescopic housing in a rotationally fixed manner.

According to the improved connection concept, the positive connection can be established and separated by inserting the adapter part and the connector part into each other and rotating them in opposite directions. For this purpose, the adapter part and the connector part are, for example, cylindrical or substantially cylindrical. In particular, the adapter part may have a cylindrical or substantially cylindrical inner surface, while the connector part has a matching cylindrical or substantially cylindrical outer surface.

In this regard, for example, the mechanical formations in the adapter part and in the connector part are each formed by elongated protrusions perpendicular to a direction of mating, which are at least partially interrupted, the protrusions being pressed against each other by a rotational movement, such as opposite rotation. This allows for easy assembly without the need for sight and/or alignment. The elongated protrusions have, for example, detents or protrusions for securing the connection.

In various embodiments, the positive connection can be established and separated by a plug-and-rotate motion via a bayonet catch having an open state and a closed state. A rotation angle between the open state and the closed state is between 30° and 60°, for example between 40° and 50°, for example approximately or exactly 45°. This also allows for ease of assembly without the need for sight and/or alignment.

In various embodiments, the connector part is designed with an internal protrusion that is adapted to engage or press into at least one opening of the outer tube. Thus, the connection between the connector part and the outer tube can be easily established before mounting the linear actuator in the telescope housing. For example, the connector part is tubular or annular, such as a substantially cylindrical tube or cylindrical ring with the projection inside.

As previously addressed, the rotational movement of the spindle system may cause translational movement of the outer tube in the axial direction. In this regard, for example, the translational movement of the outer tube occurs at a speed corresponding to a half speed of an axial extension of the telescope housing.

The adapter part has, for example, an inner side surface and one or more outer side surfaces. The inner side surface faces the connector portion. The one or more outer side surfaces face the third telescoping member.

Depending on the table design, various column shapes may be used, such as round, triangular, rectangular, or other polygonal shapes. The one or more outer side faces allow the inner surface of the third telescopic part of a column to be connected to the adapter part. The shape of the side surfaces corresponds to the shape of the profiled tube of the column used as the telescopic part and may be, for example, round or polygonal. In the case of a round profiled tube, there is only one outer side surface, and in the case of polygonal profiled tubes, there are three or more outer side surfaces.

In various embodiments, the adapter part has at least one shoulder for attaching the third telescopic part of the telescopic housing. Optionally, in addition to the shoulder, the adapter part also has a stop that can prevent the third telescopic part from slipping through. The shoulder and the optional stop are part of the outer surface(s), for example.

The inner side surface is used for connection to the connector part. The shape of the inner side surface is independent of the column shape. In this way, the adapter part "adapts" the shape of the profile tube to the shape of the connector part, which is independent of the column shape.

For example, the inner side surface in the adapter part is cylindrical and allows the adapter part to be plugged into a mantle surface of a cylindrical connector part, so that the adapter part and cylindrical part can be positively connected and disconnected by plugging into each other and rotating in opposite directions. The plug-in rotary movement produces the positive connection in the axial direction between the adapter part and the connector part.

In various embodiments, the linear actuator and the telescopic housing are adapted to be connected at a first mechanical connection point and a second mechanical connection point. At the first mechanical connection point, a first end of the linear actuator and the first telescopic member are connected such that this connection is rotationally fixed and prevents axial movement between the first end of the linear actuator and the first telescopic member. Similarly, at the second mechanical connection point, a second end of the linear actuator and the second telescopic member are connected such that this connection is rotationally fixed and prevents axial movement between the second end of the linear actuator and the second telescopic member.

For example, a positive connection in the form of a pin connection at the first mechanical connection point connects the first end of the linear actuator to the first telescopic part in a rotationally fixed manner. Alternatively or additionally, a positive connection in the form of a pin connection at the second mechanical connection point connects the second end of the linear actuator to the second telescopic part in a rotationally fixed manner.

In one embodiment, the inner tube of the linear actuator is non-rotatably connected to the first telescopic part at the first mechanical connection point with a trunnion connection, and the drive of the linear actuator is non-rotatably connected to the second telescopic part at the second mechanical connection point with a trunnion connection (thick-end-down).

In an alternative embodiment, the inner tube of the linear actuator is non-rotatably connected to the second telescopic part at the second mechanical connection point with a trunnion connection and the drive of the linear actuator is non-rotatably connected to the first telescopic part at the first mechanical connection point with a trunnion connection (thick-end-up).

Both the first and second mechanical connection points prevent axial movement between the linear actuator and the telescope housing by, for example, providing a screw connection or embossing between the linear actuator and the telescopic housing.

The connection between the third telescopic part and the outer tube of the linear actuator is established, for example, by a third mechanical connection point, which is implemented by adapter part and connector part.

An optional screw connection or embossing at the first mechanical connection point can prevent movement in the axial direction between the first end of the linear actuator and the first telescopic part. Similarly, a screw connection or embossing at the second mechanical connection point can prevent movement in the axial direction between the second end of the linear actuator and the second telescopic part.

To connect the connector part to the outer tube, the connector part is shaped, for example, as a hollow cylinder or ring with an inner circumferential surface that can be slid over the outer tube.

The inner lateral surface of the connector part has, for example, an internal protrusion which engages in a groove or opening in the outer tube of the linear actuator, thus firmly connecting the connector part to the outer tube.

After the linear actuator is installed in the telescopic housing, the inner tube of the linear actuator can be rotationally fixed to the telescopic housing. Since the hollow spindle nut is thus non-rotatably connected to both the inner tube and the outer tube, neither the outer tube nor the inner tube can rotate with respect to the telescope housing.

A rotation of the drive spindle leads to a rotational movement of the hollow spindle and, via the drive spindle nut, to an axial displacement of the hollow spindle relative to the drive spindle.

The rotary movement of the hollow spindle leads via the hollow spindle nut to an axial displacement of the inner tube, which is rotationally fixed in relation to the telescopic housing, or of the outer tube, which is rotationally fixed in relation to the telescopic housing. A rotational movement of the inner spindle system therefore causes a substantially translational movement, in particular no rotational movement, of the outer tube of the linear actuator in the axial direction.

Additionally, a rotational movement of the internal spindle system causes a translational movement of the third telescopic member, which is fixedly connected to the outer tube, in the axial direction.

In other words, a rotational movement of the drive spindle causes a translational movement of the drive spindle out of the hollow spindle and at the same time a translational movement of the inner tube out of the hollow spindle, especially in the opposite direction.

When installed, for example, the inner tube is attached to the telescopic housing on the table base side. A rotational movement of the drive spindle then causes a speed of the table plate relative to the table foot that is twice as great as the speed of the hollow spindle relative to the table foot.

Since the third telescopic member is connected to the outer tube and the position of the outer tube corresponds to the position of the hollow spindle, the outer tube and thus the third telescopic member moves at half the speed between the tabletop relative to the table base.

In order to secure the positive connection between the adapter part and the connector part achieved by the plug-and-rotate movement, the connection may be secured against rotation at the first mechanical connection point and/or the second mechanical connection point.

In one embodiment, a spigot connection is used to prevent the linear actuator from rotating relative to the telescopic housing, for example by using two spigots or screws.

In one embodiment, the first, second, and third mechanical connection points are torsionally rigid with respect to each other. This is ensured, for example, by the connector part being connected to the outer tube in a non-rotatable manner. For this purpose, for example, corresponding grooves are provided in the outer tube into which the connector part is pressed.

For easy assembly and disassembly of a linear actuator in a telescopic housing, for example, the connector part can already be connected to the linear actuator during its manufacture. Likewise, for example, the adapter part can be connected to the corresponding telescopic housing.

During assembly and disassembly, the linear actuator is inserted into the telescopic housing with the plug-in rotary movement, and a positive connection is made in the axial direction between the adapter part and the connector part.

In various embodiments, the positive connection between the adapter part and the connector part can be secured against rotation by the rotationally fixed connection at the first mechanical connection point and/or the second mechanical connection point.

In various embodiments, the connections at the first mechanical connection point and/or the second mechanical connection point are established or can be established in a rotationally fixed manner and secured against axial movement between the linear actuator and the telescopic housing when the positive connection is established. This can be ensured, for example, by arranging the boreholes and threads required for screwing the actuator or inner tube to the telescope housing on the telescope housing or linear actuator in such a way that a screw can be inserted and tightened immediately after the positive connection has been established, without the fitter first having to align it manually, which considerably reduces the production time.

A length-adjustable column, for example telescopic column, according to the improved connection concept comprises, for example, a linear actuator in one of the described embodiments, a telescopic housing in one of the described embodiments, and a connector assembly in one of the described embodiments. In this regard, the connector assembly connects the outer tube to the third telescopic member.

Such a column can be installed in a piece of furniture, such as a table but also in a bed.

A method according to the improved connection concept for manufacturing a length-adjustable column comprising a telescopic housing, a linear actuator and a connector assembly according to one of the described embodiments comprises, inter alia, the following steps:

providing the telescopic housing having first, second and third telescopic members arranged coaxially, wherein the third telescopic member is arranged at least partially inside the first telescopic member and at least partially outside the second telescopic member, and wherein at least one of the first and second telescopic members has a removable cover;

providing a linear actuator comprising a telescopic tube system surrounding an internal spindle system, wherein the telescopic tube system comprises an outer tube and at least one inner tube arranged coaxially with the outer tube, and wherein rotational movement of the spindle system does not cause rotational movement of the outer tube;

fastening the adapter part to the third telescopic member, in particular in a rotationally fixed manner and secured against displacement in the axial direction;

fastening the connector part to the outer tube of the linear actuator, in particular in a rotationally fixed manner and secured against displacement in the axial direction;

inserting the linear actuator into the telescopic housing, wherein the cover is dismantled;

rotating the linear actuator through an angle of rotation;

mounting the cover to the associated telescopic member; and forming a first connection between a first end of the linear actuator and the first telescopic member such that the first connection is non-rotatable and prevents axial movement between the first end of the linear actuator and the first telescopic member, and a second connection between a second end of the linear actuator and the second telescopic member such that the second connection is non-rotatable and prevents axial movement between the second end of the linear actuator and the second telescopic member.

For example, rotating the linear actuator positively connects the adapter part and the connector part in the axial direction. For example, the angle of rotation is between 30° and 60°, approximately between 40° and 50°, approximately exactly or approximately 45°.

In one embodiment, rotation of the linear actuator, for example a rotation through a rotation angle of 45°, positively connects the adapter part and the connector part in the axial direction and at the same time establishes or enables the establishment of a rotationally fixed connection secured against axial movement between the linear actuator and the telescopic housing at the first or second connection point, for example by suitably superimposing drilled holes and threaded holes for a screw connection.

After the rotationally fixed connection has been established at the first and second mechanical connection points, the positive connection at the third connection point is secured and can no longer be released.

Further possible embodiments of the method can be derived from the explanations of the connector assembly.

The improved connection concept is explained in more detail below by means of embodiment examples with reference to the drawings. Here, similar elements or elements of the same functions are designated with the same reference signs. Therefore, a repeated explanation of individual elements is dispensed with where appropriate.

BRIEF DESCRIPTION OF THE DRAWINGS

They show:
FIG. 2 an embodiment of a table with thick-end-down columns and section;
FIG. 3 an embodiment of a table with thick-end-up columns and section;
FIGS. 4a to 4c an embodiment of the connection arrangement;
FIGS. 5a to 5c another embodiment of the connecting arrangement;
FIG. 6a one embodiment for adapter part and connector part;
FIG. 6b a further embodiment for adapter part and connector part;
FIGS. 7a to 7c further embodiments for the adapter part;
FIG. 8 an embodiment of a linear actuator with spindle system;
FIG. 9 a detailed section of an embodiment of a linear actuator;
FIG. 13 another detail of the spindle system;
FIG. 14 a further detail of the spindle system;
FIG. 15 an embodiment of a screw connection at one end of the actuator;
FIG. 17 a block diagram of an embodiment of a manufacturing process.

DETAILED DESCRIPTION

Figure 1:
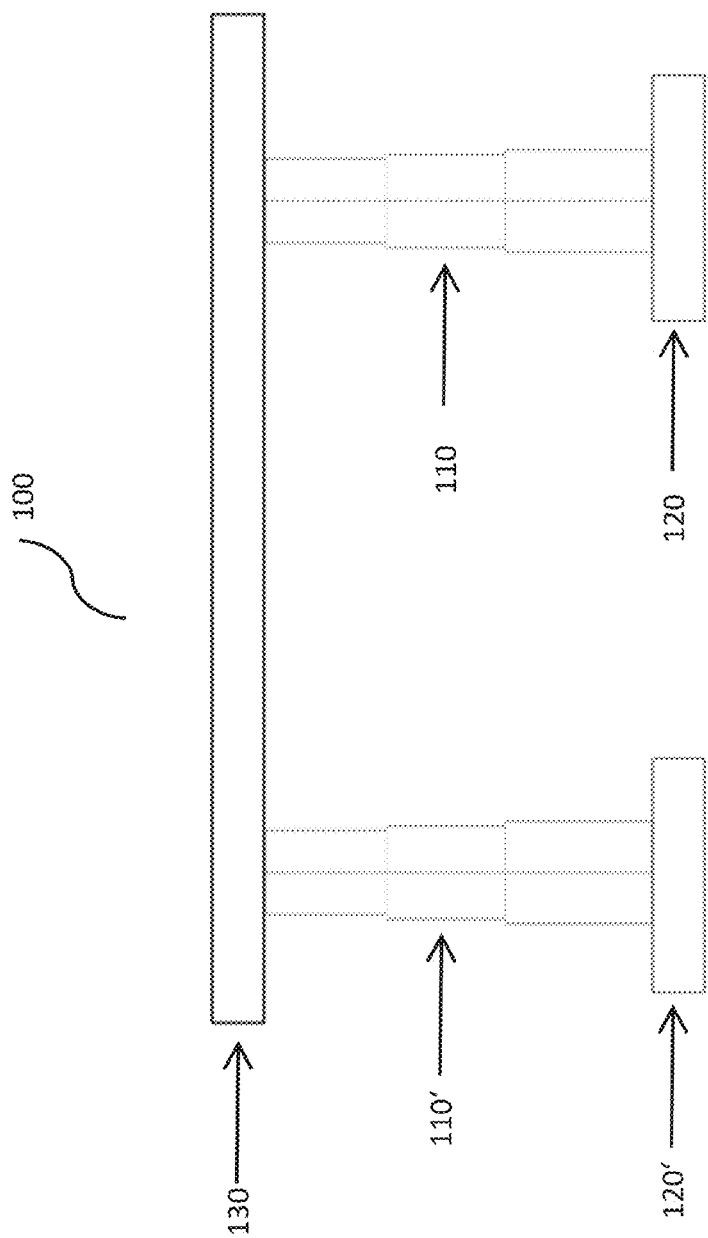
FIG. 1 an embodiment of a table with two telescopic columns.

FIG. 1 shows an electrically height-adjustable table 100 with, for example, two columns 110, 110'. Each column 110, 110' is connected to a table base 120, 120' and table top 130.

Each column 110, 110' includes a three-stage telescopic housing with a linear actuator (not shown in FIG. 1).

In FIG. 2, a table with thick-ended bottom columns 110, 110' is shown. The columns in FIG. 2 each have a three-stage telescopic housing with three telescopic members 150, 160, 170 and 150', 160', 170', respectively, arranged coaxially within each other. The left column 110' shows only the telescope housing with the telescope members. The right column 110 is cut open to show a section through the column.

A first telescopic member 150, 150' of each column is respectively connected to a table base 120, 120', a second telescopic member 160, 160' is respectively directly connected to the support system of the table top 130 or the table top 130, and a third telescopic member 170, 170' is respectively arranged inside the first telescopic member 150, 150' and outside the second telescopic member 160, 160'.

In an exemplary embodiment of the thick-end-down column, the drive 140 of the linear actuator is located in the area of the table top 130 to keep the cable connections from a control box to the drive short.

The linear actuator includes at least one electric drive 140 and a telescopic tube system surrounding an internal spindle system, the telescopic tube system having an outer tube 210 and at least one inner tube 220 disposed coaxially with the outer tube. The inner tube 220 is at least partially surrounded by the outer tube 210. Optionally, the linear actuator may also comprise a gearbox, in particular a planetary gearbox, and/or a brake.

Of the internal spindle system, only the drive spindle 200 is visible in FIG. 2, which is located within a hollow spindle that is concealed by the outer tube 210 in FIG. 2.

For example, the linear actuator is connected to the telescopic housing at three connection points. In the embodiment shown, the first connection point 320 connects the first telescopic member 150, 150' to the first end of the linear actuator. The second connection point 330 connects the second telescopic member 160, 160' to the second end of the linear actuator. The third connection point 340 connects the third telescopic member 170, 170' to the outer tube 210 of the linear actuator. In this regard, the connection is formed by a connector assembly 380 comprising an adapter part 310 provided for attachment to the third telescopic part 170' and a connector part 300 provided for attachment to the outer tube 210. A positive connection between the connector part 300 and the adapter part 310 provides a positive connection in the axial direction. The adapter part 310 is, for example, annular in shape. The connector part 300 is, for example, a substantially cylindrical ring pressed onto the outer tube 210. Further details of the connector assembly 380 are described below in connection with FIGS. 4a-4c and FIG. 6a.

In FIG. 3, a table with thick-ended top columns 110, 110' is shown. Similar to the embodiment described for FIG. 2, the columns in FIG. 3 each have a three-stage telescopic housing with three telescopic members 150, 160, 170 and 150', 160', 170', respectively, arranged coaxially within one another. The left column 110' shows only the telescope housing with the telescope parts. The right column 110 is cut open to show a section through the column.

In an exemplary embodiment of the thick-end-up column, the drive 140 of the linear actuator 400 is located in the area of the table top 130 to keep the cable connections from a control box to the drive short.

As with the thick-end-down column, the linear actuator includes at least one electric drive 140 and a telescopic tube system surrounding an internal spindle system, the telescopic tube system including an outer tube 210 and at least one inner tube 220 arranged coaxially with the outer tube. Optionally, the linear actuator may also comprise a gearbox, in particular a planetary gearbox, and/or a brake.

Of the internal spindle system, only the drive spindle 200 is visible in FIG. 3, which is located within a hollow spindle that is concealed by the outer tube 210 in FIG. 3.

As in the embodiment of FIG. 2, for example, the linear actuator is connected to the telescopic housing at three connection points. The first connection point 320 connects the first telescopic member 150, 150' to the first end of the linear actuator. The second connection point 330 connects the second telescopic member 160, 160' to the second end of the linear actuator. The third connection point 340 connects the third telescopic member 170, 170' to the outer tube 210 of the linear actuator, the connection being formed by a connection arrangement 380 comprising a connector part 300 and an adapter part 310. While the adapter part 310 is annular in shape as in the embodiment of FIG. 2, the connector part 300 in this embodiment is, for example, a substantially cylindrical tube pressed onto the outer tube 210, for example. Further details of the connector assembly 380 of the embodiment shown in FIG. 3 are described below in connection with FIGS. 5a-5c and FIG. 6b.

FIGS. 4a, 4b, and 4c show the establishment of the positive connection between adapter part 310 and connector part 300 for a thick-ended bottom column. The telescopic housing is hidden. Only the adapter part 310 is visible, which is firmly connected to the third telescopic part 170' of the telescopic housing. The position of the adapter part 310 corresponds to the position of the (not shown) third telescopic member. In the case of the thick-end-down column, for example, the connector part 300 is a substantially cylindrical ring pressed onto the outer tube 210, for example in grooves 230 of the outer tube 210.

FIG. 4a shows the situation before the positive connection between the adapter part 310 and the connector part 300 is established.

The linear actuator (shown representatively by the drive 140, the drive spindle 200 and the outer tube 210) is inserted into the telescope housing (shown representatively by the adapter part 310), for example according to the direction of the arrow shown.

FIG. 4b shows the situation after the connector part 300 is inserted into the adapter part 310.

FIG. 4c shows the situation after a rotational movement between the linear actuator and the telescope housing. Rotation of linear actuator relative to telescope housing after insertion establishes the positive connection between adapter part 310 and connector part, e.g., by a 45° rotation, without excluding other rotation angles.

FIGS. 5a, 5b, and 5c correspond basically to FIGS. 4a, 4b, and 4c for a thick-end-up column. In the thick-end-up column, the connector part 300 is, for example, a substantially cylindrical tube pressed onto the outer tube 210, for example in grooves 230 of the outer tube 210. On the tube of the connector part 300 there are, for example, protrusions 350, which contribute to the form fit with the adapter part 310.

FIG. 5a shows the situation before the positive connection is established between the adapter part 310 and the connector part 300.

FIG. 5b shows the situation after the connector part 300 has been inserted into the adapter part 310, for example according to the direction of the arrow shown in FIG. 5a.

FIG. 5c shows the situation after a rotational movement between the linear actuator and the telescopic housing. Rotation of linear actuator relative to telescope housing after insertion establishes positive engagement between adapter part 310 and connector part, for example by 45° rotation, without excluding other rotation angles.

With reference to FIG. 2, FIG. 6a shows a detail section with adapter part 310 and connector part 300 for a thick-end-down embodiment.

Both adapter part 310 and connector part 300 have elongated protrusions 350, 350', 350'', 350''' that extend intermittently rather than circumferentially, and the protrusions in adapter part 310 and connector part 300 can be pressed against each other by a rotary motion.

FIG. 6b shows a detail section with adapter part 310 and connector part 300 for a thick-end-up embossment.

Similar to FIG. 6a, again both adapter part 310 and connector part 300 have elongated protrusions 350, 350', 350'', 350''' that do not run all the way around but are interrupted, whereby the protrusions can be pressed against each other by a rotary motion. The design of the connector part 300 as a substantially cylindrical tube which can be pressed onto the outer tube 210 of the linear actuator, for example in grooves 230 of the outer tube 210, can be clearly seen. On the tube of the connector part 300 there are the elevations 350 which contribute to the form fit with the adapter part 310.

FIGS. 7a, 7b, and 7c show various embodiments for an adapter part 310 for rectangular telescopic parts. All embodiments have elongated protrusions 350, 350', 350'', 350''' which form a positive fit with corresponding protrusions on a connector part, not shown in FIGS. 7a, 7b and 7c but corresponding, for example, to those shown in FIG. 6a or FIG. 6b, by means of a bayonet lock.

The number and position of the protrusions determines the angle of rotation between an open state and a closed state of the bayonet catch, e.g. 45°, without excluding other angles of rotation.

In FIG. 7c, the adapter part 310 is designed with a shoulder 360 and a circumferential stop 370 extending around the adapter part 310. The shoulder 360 serves to allow the third telescopic tube to be placed on the adapter part 310. The stop 370 ensures that the tube does not extend beyond the adapter part 310.

FIG. 8 shows an example of a linear actuator 400 with a drive 140 and a connector part 300, such as the connector part 300 of FIG. 6, which is fixed on an outer tube 210.

At the end remote from the actuator is a first end 410 of the linear actuator 400, which has, for example, a screw connection to connect this end to a telescopic housing.

Near the drive is a second end 420 of the linear actuator 400, which also has a threaded connection for connecting to a telescoping housing.

FIG. 9 shows an example of a portion of the linear actuator 400 having the outer tube 210 with grooves 230 for attaching a connector portion 300 and the drive spindle 200.

The drive spindle 200 includes a drive spindle nut 240. The outer tube 210 is non-rotatably fitted to the drive spindle nut 240.

Figure 10:
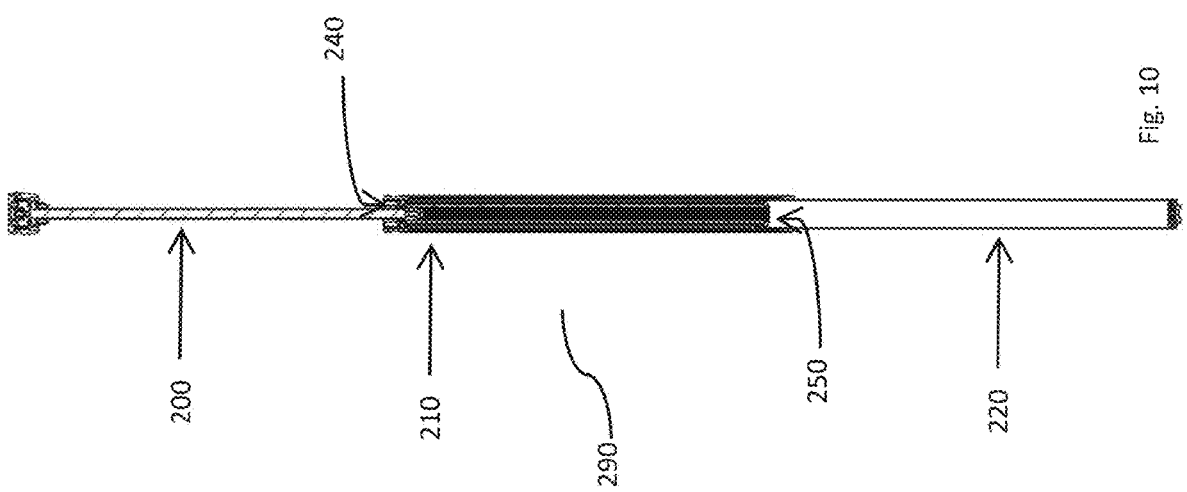
FIG. 10 an embodiment of a spindle system in the extended state.

FIG. 10 shows an example of an internal spindle system 290 with the drive spindle 200, hollow spindle 250, and inner tube 220 each located within the outer tube 210. The spindle system in FIG. 10 is shown in the extended state.

Figure 11:
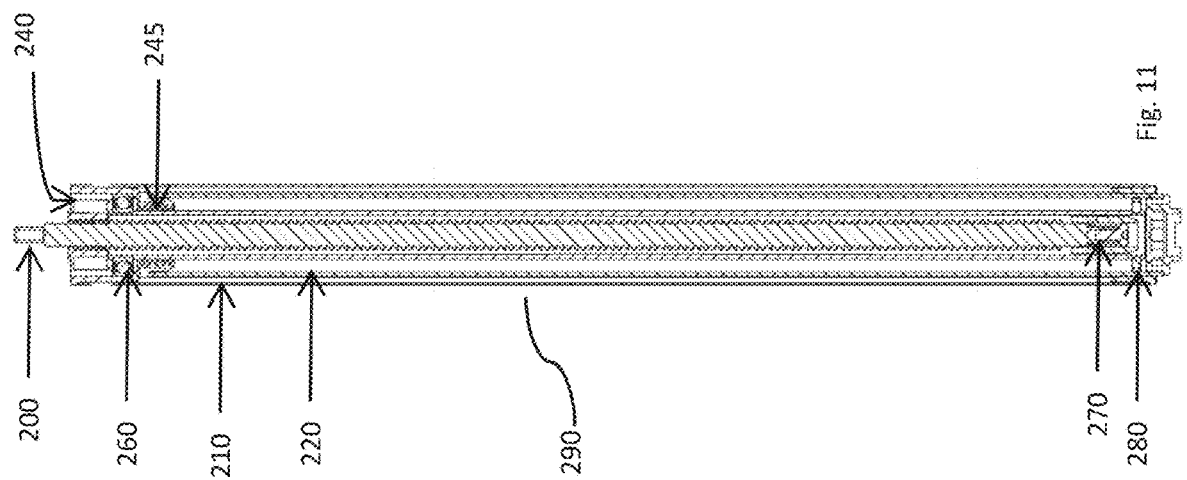
FIG. 11 an embodiment of a spindle system in a retracted state.

FIG. 11 also shows the internal spindle system 290 of FIG. 10 in a slightly enlarged view and in the retracted state. The drive spindle nut 240 and ball bearing 260 required for mounting the outer tube 210 can be seen.

The drive spindle 200 has a ribbed sliding element 270 at the end remote from the drive, which is connected to the drive spindle 200 so as to be rotationally fixed but axially displaceable, and transmits torque to the hollow spindle 250 via the ribs 255 on the inside of the hollow spindle 250.

At one end, the hollow spindle 250 has a sliding guide 280 for the inner tube 220, which is connected to the hollow spindle 250 in a rotationally fixed manner. The inner tube 220 is internally smooth and the sliding guide 280 allows rotational movement of the inner tube 220 relative to the hollow spindle 250.

Figure 12:
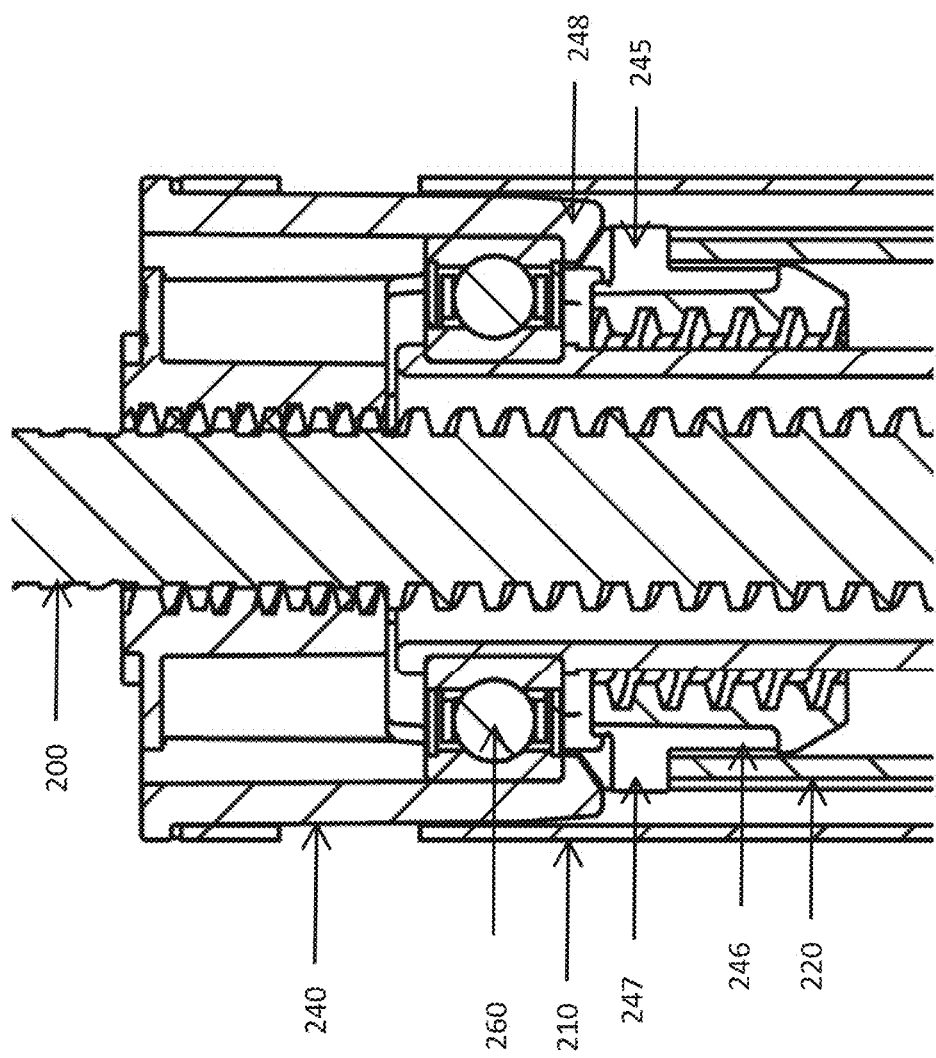
FIG. 12 a detail of the spindle system of FIG. 11.

FIG. 12 shows an enlarged view of the spindle system 290 of FIG. 10 and FIG. 11 in the area of the hollow spindle nut 245.

The hollow spindle 250 includes a hollow spindle nut 245. The hollow spindle nut 245 includes a retainer 246 for non-rotatably mounting the inner tube 220 and a retainer 247 for non-rotatably mounting the outer tube 210. The retainer 247 for non-rotational mounting of the outer tube 210 is ribbed and engages a ribbing on the inner surface of the outer tube 210. The retainer 246 for non-rotational mounting of the inner tube 220 includes a shoulder onto which the inner tube 220 is fitted.

The drive screw nut 240 has a shoulder for mounting the outer tube 210. The drive screw nut 240 includes grippers or snaps 248 to engage around the ball bearing 260 to hold the hollow spindle 250 to the drive screw nut 240.

FIG. 13 shows a detailed view of the hollow spindle 250 with the ball bearing 260. The hollow spindle 250 and the ball bearing 260 are fixed to each other. The ball bearing 260 allows the outer tube 210 (not shown here) to be rotatably supported. Thus, rotation of the hollow spindle 250 within the outer tube 210 is enabled.

The hollow spindle 250 has ribs or nubs 255 on its inner surface, which are engaged by the correspondingly shaped ribs or nubs on the outer surface of the sliding element 270 and transmit the torque of the drive shaft 200 to the hollow spindle 250.

In FIG. 13, the inner tube 220 is mounted to the hollow spindle nut 245. The outer tube 210 is not mounted, but the bracket 247 for the outer tube can be seen.

In FIG. 14, the drive spindle 200 is visible with the sliding element 270 attached to one end of the drive spindle 200. The sliding element 270 engages the ribbing 255 on the inner side of the hollow spindle 250. This allows axial displacement between the inner tube 220 and outer tube 210, but they rotate with each other.

It should be noted that the embodiment of linear actuator 400 described in connection with FIGS. 8 to 14 is only one possible embodiment suitable for mounting in a telescopic housing by means of connector assembly 380. Other embodiments of a linear actuator 400 are not intended to be excluded thereby. In particular, linear actuators 400 are suitable which have a telescopic tube system with an internal spindle system 290 and in which rotational movement of the spindle system 290 does not cause rotational movement of the outer tube 210

In FIG. 15, an exploded view is shown of an exemplary threaded connection at a first end 410 of the linear actuator. In this embodiment, the contact surfaces 450 of the telescopic housing, such as a lower cover, and the contact surfaces 430 at the first end 410 of the linear actuator are aligned such that the bolting 440' and 440" of the telescopic housing and linear actuator can be performed.

Figure 16:
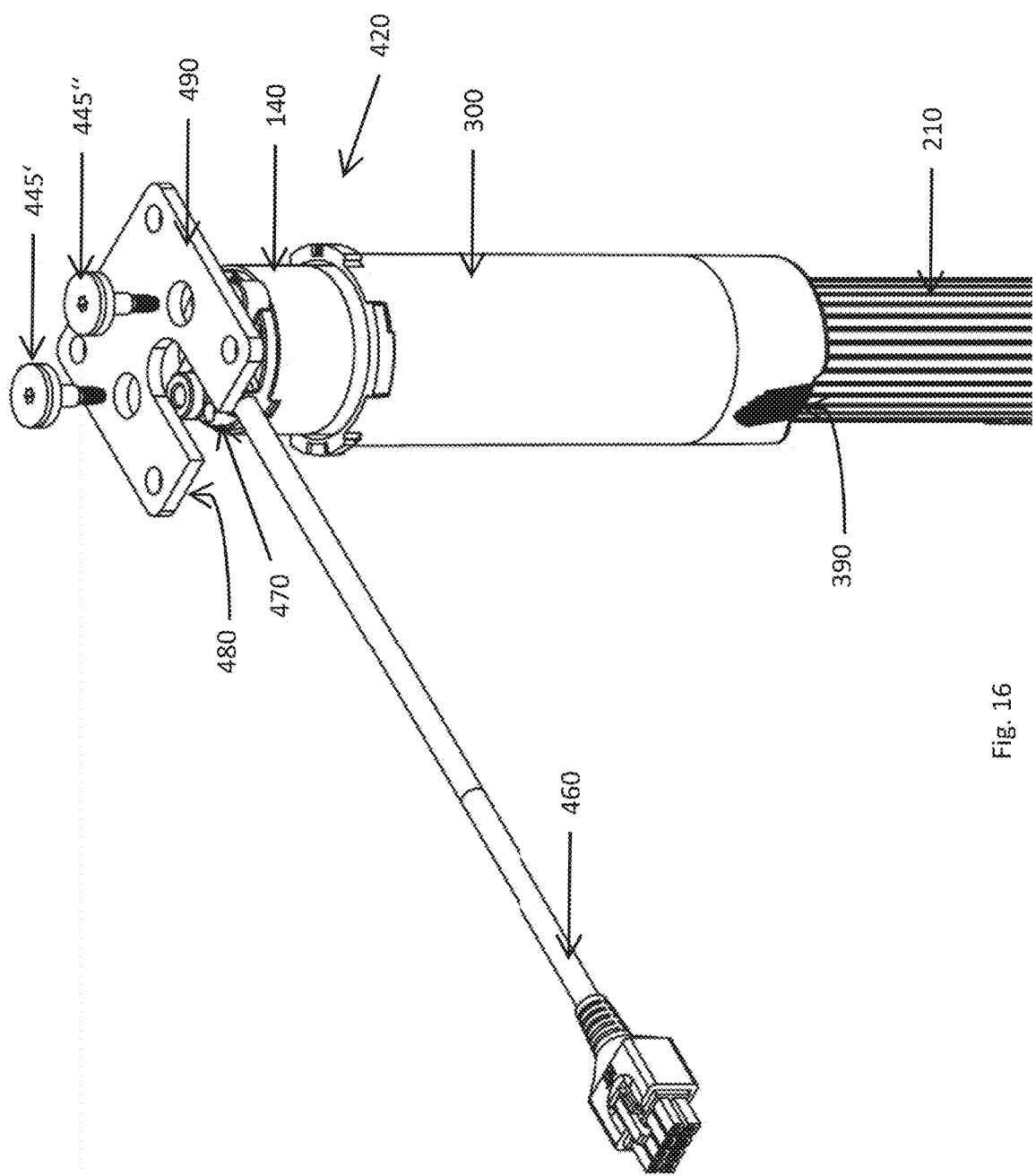
FIG. 16 an embodiment of a screw connection at another end of the actuator.

FIG. 16 shows an exploded view of an exemplary bolted connection at a second end 420 of the linear actuator. In this embodiment, the contact surfaces 480 of the telescopic housing are part of a removable cover 490 of the telescopic housing. The contact surfaces 480 of the telescopic housing and the contact surfaces 470 at the second end 420 of the linear actuator are aligned to allow a threaded connection 445' and 445" of the telescopic housing and the linear actuator. For example, the cover 490 is shaped to allow a connecting cable 460 of the linear actuator 400 to extend out.

In FIG. 17, a block diagram is shown for a method of manufacturing an electrically length-adjustable column 500.

In a step 510, the telescopic housing is provided with a plurality of telescopic members 150, 160, 170 arranged coaxially, wherein at least one of the plurality of telescopic members 150, 160, 170, such as the first and/or the second telescopic member 150, 160, includes a removable cover.

In a step 520, the linear actuator 400 is provided comprising a telescopic tube system surrounding an internal spindle system 290, the telescopic tube system comprising an outer tube 210 and at least one inner tube 220 arranged coaxially with the outer tube 210. Steps 510 and 520 may be interchanged.

In a step 530, the adapter part 310 is fixed to the third telescopic part 170 in such a way that the adapter part 310 is connected to this third telescopic part 170, for example in a rotationally fixed manner and secured against displacement in the axial direction.

In a further step 540, the connector part 300 is attached to the outer tube 210 of the linear actuator, for example again in a rotationally fixed manner and secured against displacement in the axial direction. Steps 530 and 540 may be interchanged. In particular, any sequence of steps 510 to 540 is possible as long as a linear actuator with mounted connector part and a telescopic housing with mounted adapter part are present at the end.

In a subsequent step 550, the linear actuator 400 is inserted into the telescopic housing with the cover of a telescopic part 490 disassembled.

In a further step 560, the linear actuator 400 is rotated through a rotation angle. The angle of rotation is approximately between 30° and 60°, in particular between 40° and 50°, in particular around 45°.

The rotation of the linear actuator 400 establishes the positive connection in the axial direction between the adapter part 310 and the connector part 300.

At the same time, conditions are established at the first connection point 320 and at the second connection point 330 that allow the assembler to establish a rotationally fixed connection secured against axial movement between the linear actuator 400 and the telescopic housing. For example, rotation causes the screw holes for the screws to line up with the threaded holes. The fitter only needs to insert and tighten the screws. This eliminates the need for the previously time-consuming manual alignment of linear actuator and telescopic housing.

In another embodiment, the rotation directly establishes a connection at the first connection point 320 and second connection point 330 that is rotationally fixed and secured against axial movement between the linear actuator 400 and the telescope housing, for example, by the linear actuator including a screw thread at one end that is screwed into a corresponding thread in the telescope housing.

In a further step 570, the telescopic portion is closed with the removable cover 490.

In a further step 580, a connection between the linear actuator 400 and the telescopic housing is established that is rotationally fixed and secured against axial movement between the linear actuator 400 and the telescopic housing.

For example, establishing a first connection between the first end 410 of the linear actuator and the first telescopic member 150 is performed such that the first connection is rotationally fixed, such as at the first mechanical connection point 320, and prevents axial movement between the first end 410 of the linear actuator 400 and the first telescopic member 150. Similarly, establishing a second connection between a second end 420 of the linear actuator and the second telescoping portion 160 is done such that the second connection, at the second mechanical connection point 330, is rotationally fixed and prevents axial movement between the second end 420 of the linear actuator 400 and the second telescoping portion 160.

What is claimed is:

1. A connector assembly for connecting a linear actuator to a telescopic housing, wherein
   the linear actuator comprises a telescopic tube system surrounding an internal spindle system, wherein the telescopic tube system comprises an outer tube and at least one inner tube arranged coaxially with the outer tube and at least partially surrounded by the outer tube, and wherein rotational movement of the internal spindle system does not cause rotational movement of the outer tube; and
   the telescopic housing comprises first, second, and third telescopic members arranged coaxially, wherein the third telescopic member is disposed at least partially within the first telescopic member and at least partially outside the second telescopic member;
   the connection assembly comprising
      an adapter part arranged to be attached to the third telescopic member; and
      a connector part arranged for attachment to the outer tube; wherein
         the adapter part and the connector part have mechanical formations for establishing a positive connection in an axial direction, which is arranged for connecting the outer tube to the third telescopic member;
         wherein the positive connection is established and separated by interlocking and oppositely rotating the adapter part and the connector part.

2. The connector assembly according to claim 1, wherein the mechanical formations in the adapter part and in the connector part are each formed by elongated protrusions perpendicular to a direction of interlocking, which are at least partially discontinuous, wherein the elongated protrusions are pressed against each other by a rotational movement.

3. The connector assembly according to claim 1, wherein
   the positive connection is established and separated by a plug-in rotational movement via a bayonet catch having an open state and a closed state; and
   a rotation angle between the open state and the closed state is between 30° and 60°.

4. The connector assembly according to claim 1, wherein the connector part comprises an internal protrusion configured to engage or press into at least one opening of the outer tube.

5. The connector assembly according to claim 1, wherein the rotational movement of the spindle system causes a translational movement of the third telescopic member connected to the outer tube in the axial direction.

6. The connector assembly according to claim 1, wherein the rotational movement of the spindle system causes a translational movement of the outer tube in the axial direction.

7. The connector assembly according to claim 6, wherein the translational movement of the outer tube is at a speed corresponding to half a speed of an axial extension of the telescopic housing.

8. The connector assembly according to claim 1, wherein the adapter part comprises a shoulder and a stop configured to fit the third telescopic member of the telescopic housing.

9. The connector assembly according to claim 1, wherein
   the linear actuator and the telescopic housing are configured to be connected at a first mechanical connection point and a second mechanical connection point;
   at the first mechanical connection point, a first end of the linear actuator and the first telescopic member are connected such that the connection is rotationally fixed and secured against axial movement between the first end of the linear actuator and the first telescopic member; and
   at the second mechanical connection point, a second end of the linear actuator and the second telescopic member are connected such that the connection is rotationally fixed and secured against axial movement between the second end of the linear actuator and the second telescopic member.

10. The connector assembly according to claim 9, wherein
   a positive connection in the form of a trunnion connection at the first mechanical connection point connects the first end of the linear actuator to the first telescopic member in a rotationally fixed manner; and/or
   a positive connection in the form of a trunnion connection at the second mechanical connection point connects the second end of the linear actuator to the second telescopic member in a rotationally fixed manner.

11. The connector assembly according to claim 9, wherein:
   a screw connection or embossing at the first mechanical connection point prevents movement in an axial direction between the first end of the linear actuator and the first telescopic member; and/or
   a screw connection or embossing at the second mechanical connection point prevents movement in the axial direction between the second end of the linear actuator and the second telescopic member.

12. The connector assembly according to claim 9, wherein the positive connection between the adapter part and the connector part is secured against rotation by a rotationally fixed connection at the first mechanical connection point and/or the second mechanical connection point.

13. The connector assembly according to claim 9, wherein the connections at the first mechanical connection point and/or the second mechanical connection point are established when the positive connection is established between the adapter part and the connector part.

14. A length-adjustable column comprising a linear actuator, a telescopic housing, and a connector assembly according to claim 1, wherein
   the linear actuator comprises a telescopic tube system surrounding an internal spindle system, wherein the telescopic tube system comprises an outer tube and at least one inner tube arranged coaxially with the outer tube and at least partially surrounded by the outer tube, and wherein rotational movement of the spindle system does not cause rotational movement of the outer tube; and
   the telescopic housing comprises first, second, and third telescopic members arranged coaxially, wherein the third telescopic member is disposed at least partially within the first telescopic member and at least partially outside the second telescopic member; and the connector assembly connects the outer tube to the third telescopic member.

15. A piece of furniture comprising at least one telescopic column according to claim 14.

16. The piece of furniture of claim 15, wherein the piece of furniture is one of a table or a bed.

17. A method of manufacturing a length-adjustable column from a telescopic housing, a linear actuator, and a connector assembly according to claim 1, the method comprising:

providing the telescopic housing having first, second and third telescopic members arranged coaxially, wherein the third telescopic member is arranged at least partially inside the first telescopic member and at least partially outside the second telescopic member, and wherein at least one of the first and second telescopic members has a removable cover;

providing a linear actuator comprising a telescopic tube system surrounding an internal spindle system, wherein the telescopic tube system comprises an outer tube and at least one inner tube arranged coaxially with the outer tube, and wherein rotational movement of the spindle system does not cause rotational movement of the outer tube;

fastening the adapter part to the third telescopic member in a rotationally fixed manner and secured against displacement in the axial direction;

fastening the connector part to the outer tube of the linear actuator in a rotationally fixed manner and secured against displacement in the axial direction;

inserting the linear actuator into the telescopic housing, wherein the removable cover is dismantled;

rotating the linear actuator through an angle of rotation;

mounting the cover to one of the first, second and third telescopic members; and forming a first connection between a first end of the linear actuator and the first telescopic member such that the first connection is non-rotatable and prevents axial movement between the first end of the linear actuator and the first telescopic member, and a second connection between a second end of the linear actuator and the second telescopic member such that the second connection is non-rotatable and prevents axial movement between the second end of the linear actuator and the second telescopic member.

18. The method according to claim 17, wherein rotating the linear actuator positively connects the adapter part and the connector part in the axial direction.

19. The method according to claim 17, wherein the angle of rotation is between 30° and 60°.

* * * * *